(12) United States Patent
Yokota et al.

(10) Patent No.: US 7,954,893 B2
(45) Date of Patent: Jun. 7, 2011

(54) HEADREST FOR VEHICLE SEAT

(75) Inventors: Masaaki Yokota, Akishima (JP); Atsushi Koike, Akishima (JP)

(73) Assignee: Tachi-S Co., Ltd., Akishima-Shi Tokyo (JP)

(*) Notice: Subject to any disclaimer, the term of this patent is extended or adjusted under 35 U.S.C. 154(b) by 70 days.

(21) Appl. No.: 12/407,036

(22) Filed: Mar. 19, 2009

(65) Prior Publication Data

US 2009/0200843 A1 Aug. 13, 2009

(51) Int. Cl.
*B60N 2/42* (2006.01)
*B60N 2/427* (2006.01)
*B60N 2/48* (2006.01)
*B60R 21/055* (2006.01)

(52) U.S. Cl. .................. 297/216.12; 297/391
(58) Field of Classification Search ............ 297/216.12, 297/391, 452.2
See application file for complete search history.

(56) References Cited

U.S. PATENT DOCUMENTS

| 3,205,005 | A | * | 9/1965 | Brown | 297/216.12 X |
| 3,223,447 | A | * | 12/1965 | Terracini | 297/397 |
| 3,508,788 | A | * | 4/1970 | Barton, Jr. et al. | 297/391 |
| 3,528,703 | A | * | 9/1970 | Ohta | 297/391 |
| 3,544,164 | A | * | 12/1970 | Ohta | 297/452.2 |
| 4,489,979 | A | * | 12/1984 | Zyngier | 297/391 |
| 4,527,834 | A | * | 7/1985 | Zyngier | 297/391 X |
| 4,744,601 | A | * | 5/1988 | Nakanishi | 297/391 |
| 4,779,928 | A | * | 10/1988 | Collier et al. | 297/391 |
| 4,840,428 | A | * | 6/1989 | Kobayashi et al. | 297/391 X |
| 4,844,544 | A | * | 7/1989 | Ochiai | 297/216.12 X |
| 4,861,107 | A | * | 8/1989 | Vidwans et al. | 297/391 X |
| 4,991,907 | A | * | 2/1991 | Tanaka | 297/408 |
| 5,328,244 | A | * | 7/1994 | Ishihara et al. | 297/391 |
| 5,769,489 | A | * | 6/1998 | Dellanno | 297/216.12 |
| 5,927,814 | A | * | 7/1999 | Yoshimura | 297/391 |
| 5,961,182 | A | * | 10/1999 | Dellanno | 297/216.12 |
| 6,000,760 | A | * | 12/1999 | Chung | 297/408 |
| 6,068,338 | A | * | 5/2000 | Takei et al. | 297/391 |
| 6,224,158 | B1 | * | 5/2001 | Hann | 297/391 |
| 6,631,956 | B2 | * | 10/2003 | Mauro et al. | 297/391 X |
| 6,722,740 | B2 | * | 4/2004 | Imayou et al. | 297/408 |
| 6,789,850 | B1 | * | 9/2004 | Hann | 297/391 |
| 6,880,891 | B2 | * | 4/2005 | Yetukuri et al. | 297/391 X |
| 6,983,995 | B1 | * | 1/2006 | Veine et al. | 297/391 |
| 7,152,928 | B2 | * | 12/2006 | Yetukuri et al. | 297/216.12 X |
| 7,213,887 | B2 | * | 5/2007 | Dudash et al. | 297/391 X |
| 7,537,282 | B2 | * | 5/2009 | Veine et al. | 297/216.12 |
| 2005/0001463 | A1 | * | 1/2005 | Yetukuri et al. | 297/391 |
| 2005/0253429 | A1 | * | 11/2005 | Veine et al. | 297/216.1 |
| 2007/0035163 | A1 | * | 2/2007 | Andrews | 297/216.12 |

FOREIGN PATENT DOCUMENTS

JP 2006-69286 A 3/2006

* cited by examiner

*Primary Examiner* — Rodney B White
(74) *Attorney, Agent, or Firm* — Browdy and Neimark, PLLC

(57) ABSTRACT

A headrest for vehicle seat includes: a generally inverted-U-shaped frame having a pair of headrest stays defined therein; and an impact absorption bar fixedly connected between those two headrest stays. The impact absorption bar is located in a predetermined spaced relation with an upper horizontal frame portion of the generally inverted-U-shaped frame. When a rear-end collision or the like occurs, a head of seat occupant is stably received by those impact absorption bar and upper horizontal frame portion, while the impact absorption bar being readily deformed by backward excessive great load applied thereto from the seat occupant's head to thereby absorb and reduce a corresponding impact energy to be imparted to the head.

1 Claim, 3 Drawing Sheets

HEADREST FOR VEHICLE SEAT

BACKGROUND OF THE INVENTION

1. Field of the Invention

The present invention relates to a headrest to be mounted on a seat back of a vehicle seat, and in particular, the invention is directed to an improvement of the headrest which not only provides a reliable support for a head of seat occupant, but also provides a high absorption of an impact given to the seat occupant's head in case of a backward or rear-end collision or the like.

2. Description of Prior Art

In general, a headrest, adapted to be mounted on a seat back of vehicle seat, is comprised of a trim cover assembly, a foam padding and a pair of headrest stays. In most cases, in assembly of the headrest, a three-dimensional trim cover assembly is preformed, which conforms to a predetermined contour of the headrest, and a pair of spaced-apart headrest stays are also preformed by bending a tubular rod member in an inverted-U-shaped configuration so that a pair of rectilinearly extending rod portions thereof constitutes that particular pair of headrest stays. In this regard, so formed inverted-U-shaped rod member with two headrest stays defined therein is placed in the inside of the three-dimensional trim cover assembly in such a fashion that the two headrest stays extend outwardly from a bottom wall of the trim cover assembly, thereby providing a basic headrest unit. Such basic headrest unit is placed in a foaming die, after which, a liquid foaming agent is injected into the inside of the trim cover assembly and cured into an increased mass of foam padding filled therein. In that normal process of assembly, a resultant headrest is produced, in which the foam padding, overlaying a part of the inverted-U-shaped rod member, is effective in giving a cushony and resilient support for the head of seat occupant.

In the foregoing typical headrest, a horizontal rod portion of the inverted-U-shaped rod member (i.e. a transversely extending rod portion defined between the two headrest stays) serves to receive a great load applied from the head of seat occupant which is displaced thereto under backward inertia in the case of rear-end collision. Otherwise stated, when a rear-end collision occurs, the seat occupant's head is abruptly displaced and pressed against the headrest under the backward inertia thereof, while being forcibly sunk into the foam padding of the headrest. As a result thereof, an excessive great load thus applied from the head is received by the afore-said horizontal rod portion of inerted-U-shaped rod member, via a compressed local region of the foam padding.

In this regard, it is important that the seat occupant's head should be displaced to a proper head receiving area of the headrest in which the afore-said horizontal rod portion extends transversely thereof, so that a whole of excessive great load applied from the head is received by that horizontal rod portion.

Let us now assume that the seat occupant's head is displaced backwards to a point lower or above the horizontal rod portion, which means that the backward movement of head does not correspond to the above-defined proper head receiving area, when a rear-end collision occurs. In that case, it is highly possible that the head will be inclined excessively either backwardly or forwardly relative to the horizon rod portion.

Such problem is simply due to the fact that the proper head receiving area of headrest is narrow or small, because nothing but the horizontal rod portion receives the load applied from the seat occupant's head.

Thus, it is necessary to increase or widen such head receiving area in a vertical direction of the headrest. For that purpose, for example, the Japanese Laid-Open Patent Publication No. 2006-69286 suggests bending a horizontal rod portion of inverted-U-shaped rod member in a vertically extending configuration, such as a generally V-shaped configuration, within the headrest, and also suggests formation of a support bar between two vertically extending rod portions of that inverted-U-shaped rod member within the headrest. Accordingly, the head receiving area is increased in the vertical direction of headrest, thereby avoiding the possibility that the head will be inclined excessively either backwardly or forwardly relative to the horizontal rod portion in the case of rear-end collision.

However, according to the foregoing construction, it is certainly possible to prevent the excessive inclination of the seat occupant's head relative to the horizontal rod portion, but, when a rear-end collision actually occurs, the seat occupant's head will be forcibly pressed against and sunk deeply into the headrest at the widened head receiving area where the afore-said vertically bent rod portion or support bar lies. As a consequence thereof, the localized region of foam padding is greatly compressed between the head and such rod portion or support bar, to an excessively small degree at which the elastic repercussive force of that foam padding localized region no longer absorbs a corresponding impact energy given to the head.

To solve this problem, the foregoing Japanese prior art (2006-69286) suggests provision of a low-repercussive elastic material between the foam padding and the rod portion or support bar in order to absorb the impact energy. This arrangement however increases the weight of headrest as well as costs for assembly of the headrest.

Also, the Japanese prior art indicates another alternative arrangement that does not require such provision of low-repercussive elastic material, as shown in FIGS. 8 and 9, but, according thereto, a whole of impact energy caused is not absorbed by foam padding and therefore, a remaining portion of the impact energy, which is not absorbed by the foam padding, is imparted via the hard rod portion or hard support bar to the seat occupant's head. Thus, even in that alternative mode, there still remains the problem that the seat occupant's head will not be sufficiently protected against the impact energy in the case of rear-end collision or the like.

SUMMARY OF THE INVENTION

In view of the above-stated drawbacks, it is a purpose of the present invention to provide an improved headrest which not only insures to support a head of seat occupant in a highly stable manner, but also provides a highly improved absorption of impact energy, when an excessive great load is applied to the headrest from the seat occupant's head in the case of a rear-end collision or due to a factor causing the backward excessive great load.

In order to achieve such purpose, a headrest in accordance with the present invention is basically comprised of:

a generally inverted-U-shaped frame having, defined therein, a horizontal frame portion and a pair of spaced-apart vertical frame portions extending vertically and continuous from said horizontal frame portion;

a pair of spaced-apart headrest stays defined integrally in two lower portions respectively of said pair of spaced-apart vertical frame portions, said pair of spaced-apart headrest stays being adapted to be mounted in said vehicle seat;

an impact absorption bar element fixedly connected between said pair of spaced-apart vertical frame portions in such a manner as to extend transversely of said pair of spaced-apart vertical frame portions, while being spaced a predetermined distance from said horizontal frame portion;

said impact absorption bar element being of a property prone to deformation only by an excessive great load applied thereto in case of a rear-end collision or a factor for causing said excessive great load; and a headrest body including a foam padding filled therein;

wherein said horizontal frame portion, said pair of spaced-apart vertical frame portions, and said impact absorption bar element are embedded integrally in said foam padding of said headrest body, while said pair of spaced-apart headrest stays extend outwardly from said headrest body.

As a preferred mode of the present invention, a substantially midway point of said impact absorption bar element may be made small in the cross-sectional area thereof by adjusting coefficient of cross-section of said impact absorption bar element, so that a readily deform able region in said substantially midway point.

Preferably, the foregoing readily deformable region may be a recessed or cut-away region formed in said substantially midway point of said impact absorption bar element.

Other features and advantages of the present invention will become apparent from reading of the description, hereinafter, with reference to the annexed drawings.

DETAILED DESCRIPTION OF PREFERRED EMBODIMENTS OF THE INVENTION

Figure 1:
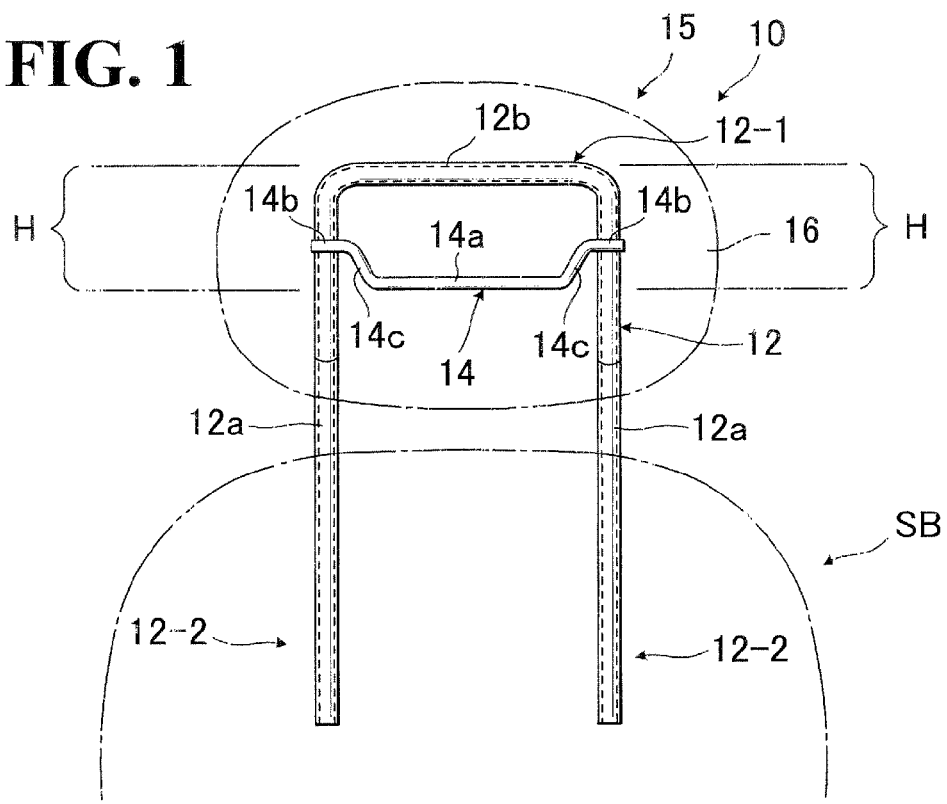
FIG. 1 is a schematic front view showing a first embodiment of headrest in accordance with the present invention.
Figure 2:
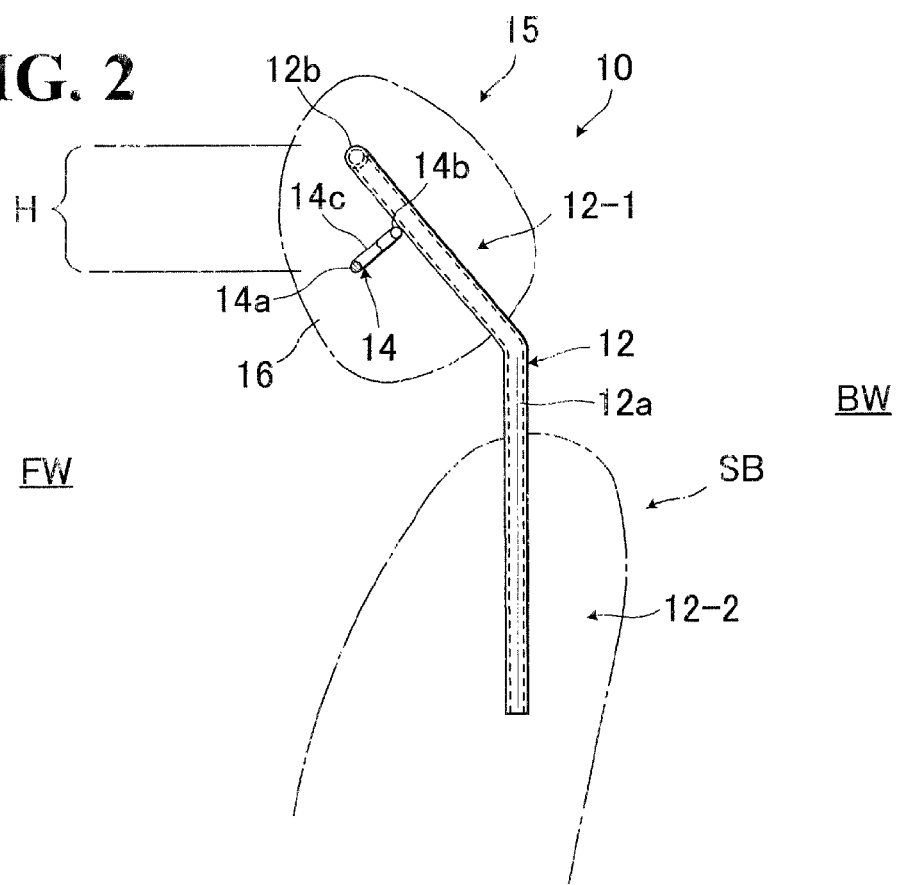
FIG. 2 is a schematic side view showing the first embodiment of headrest.
Figure 3:
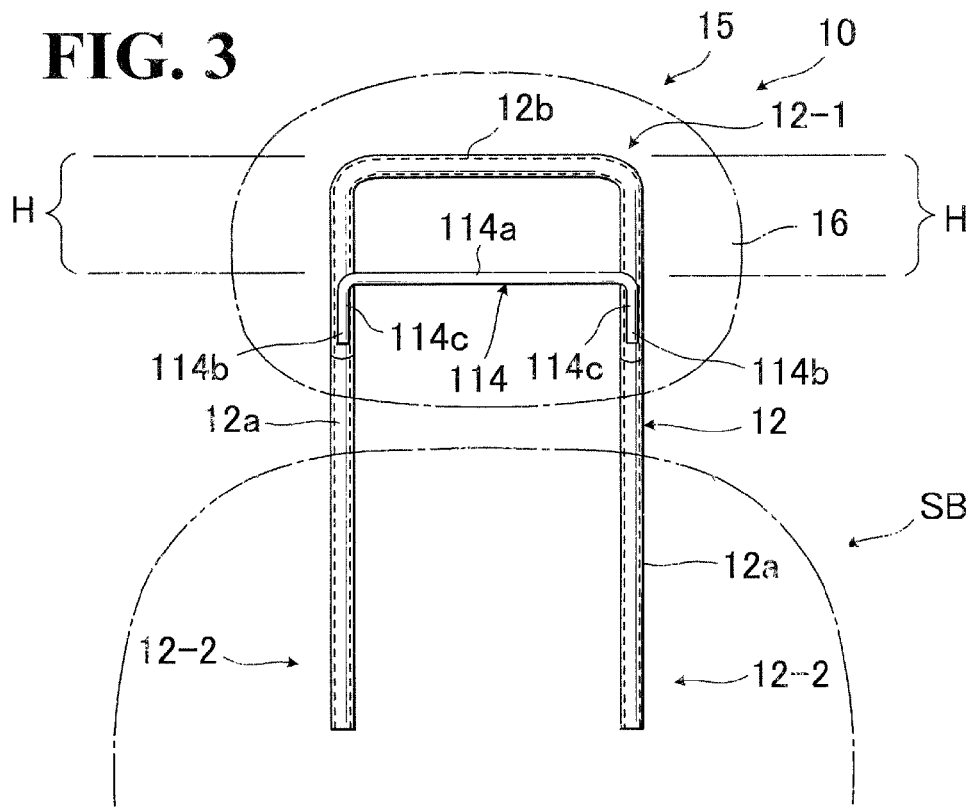
FIG. 3 is a schematic front view showing a second embodiment of headrest in accordance with the present invention.
Figure 4:
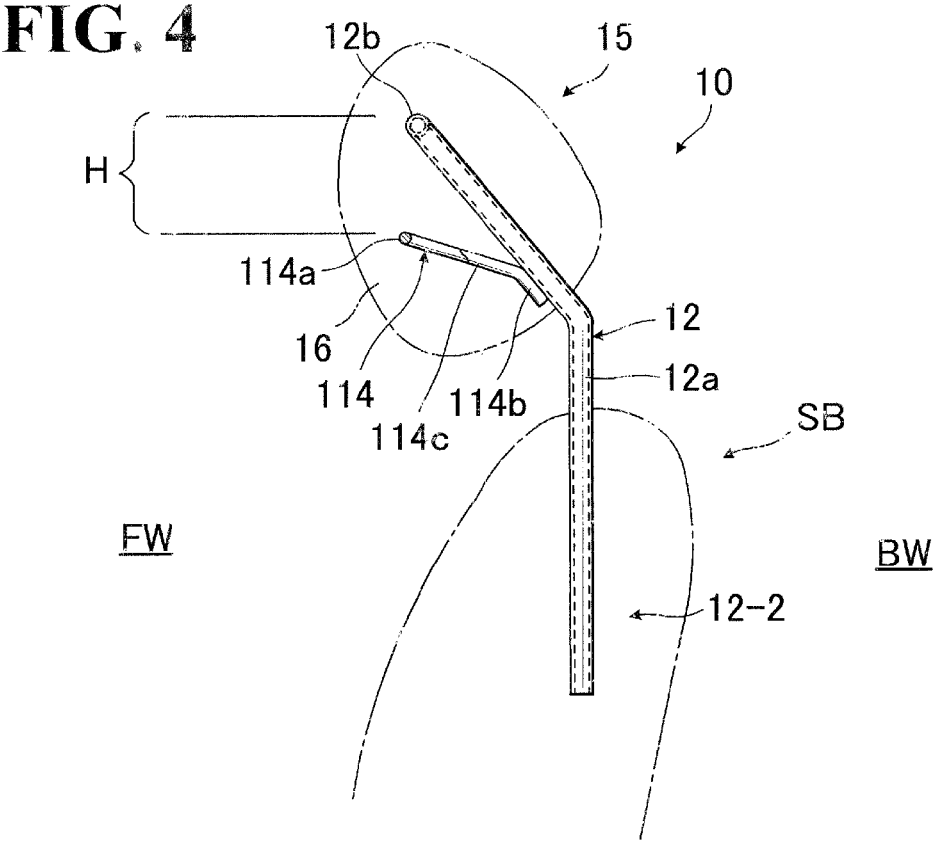
FIG. 4 is a schematic side view showing the second embodiment of headrest.

Referring to FIGS. 1 to 6, there are illustrated preferred embodiments of headrest in accordance with the present invention. The headrest is generally designated by (10). FIGS. 1 and 2 show a first exemplary mode of the headrest (10) in accordance with the present invention. FIGS. 3 and 4 show a second alternative exemplary mode of the headrest (10) in accordance with the invention.

It is to be noted that the term, "forward" or "forwardly," refers to a side (FW) forwardly of the headrest (10) as well as of the seat back (SB), whereas the term, "backward" or "backwardly", refers to a side (BW) backwardly of the headrest (10).

In the present embodiment, as best seen in FIG. 1, the headrest (10) is comprised of: a headrest body (15); a generally inverted-U-shaped tubular frame (12) having a pair of spaced-apart headrest stays (12a) and (12a) defined integrally in the respective two vertical frame portions thereof; and a crank-shaped impact absorption bar (14).

As understandable commonly from the first and second modes shown in FIGS. 1 to 4, the generally inverted-U-shaped tubular frame (12) has a head support portion (12-1) embedded in the headrest body (16) and a pair of spaced-apart headrest stays (12a) (12a) extending downwardly from a bottom side of the hardest body (16), as with conventional headrest construction. Strictly stated, as seen FIGS. 1 and 3 for instance, the generally inverted-U-shaped tubular frame (12) has, defined therein, an upper horizontal frame portion (12b) and a pair of vertical frame portions (12-2) and (12-2). In both two illustrative embodiments, it is to be seen that the afore-said head support portion (12-1) refers to an upper region of the generally inverted-U-shaped tubular frame (12) which includes the upper horizontal frame portion (12b) and two upper regions respectively of the two vertical frame portions (12-2), and that the two headrest stays (12a) are defined in the respective two lower portions of the two vertical frame portions (12-2) that project outwardly from the bottom side of the headrest by (16).

Further, as far as the first and second embodiments are concerned, it is to be seen that the generally inverted-U-shaped tubular frame (2) is formed such that the head support portion (12-1) thereof is inclined forwardly relative to the vertical frame portions (12-2) or the two headrest stays (12a).

In accordance with the present invention, the impact absorption bar (14) is fixedly attached to the head support portion (12-1) of the frame (12) to establish a head receiving area (H) in conjunction with the horizontal portion (12b) of the frame (12).

Assembly of the above-described headrest (10) is carried out by a conventional foaming process. Namely. While not shown, a three-dimensional trim cover assembly is provided, which conforms to a predetermined contour of headrest, and the foregoing generally inverted-U-shaped tubular frame (12) is attached to that trim cover assembly, such that the head support portion (12-1) thereof is disposed within the trim cover assembly, while the two headrest stays (12a) (12a) project outwardly from a bottom side of the trim cover assembly. Then, such basic headrest unit is placed in an appropriate foaming die (not shown), followed by injecting a liquid foaming agent (not shown) into the inside of the trim cover assembly placed in that foaming die. The liquid foaming agent is cured into an increased mass of foam padding (16) filled in the trim cover assembly. Thus, as understandable from FIG. 1, both impact absorption bar (14) and head support portion (12-1) of the generally inverted-U-shaped frame (12) are embedded in the foam padding (16) in integral manner.

According to the present first embodiment, the impact absorption bar (14) per se is of a crank shape having:

- a pair of connecting end portions (14b) and (14b) extending horizontally in a direction opposite to each other;
- a pair of bent intermediate bar portions (14c) and (14c) which are bent outwardly and continuous from the foregoing two connecting end portions (14b) and (14b) respectively; and
- a deformable main bar portion (14a) extending rectilinearly between those two bent intermediate frame proteins (14c) in an offset relation with the pair of connecting end portions (14b).

As seen in FIGS. 1 and 2, the two connecting end portions (14b) of the impact absorption bar (41) are respectively coupled, as by welding, with the two upper regions respective of the two headrest stays (12a), so that the deform able main bar portion (14a) extends transversely of the generally inverted-U-shaped tubular frame (12) in a parallel relation with the upper horizontal frame portion (12b) of the latter so as to define a predetermined head receiving area (H) between those particular upper horizontal portion (12b) and deform able main frame portion (14a).

Accordingly, it is to be appreciated that:—

(i) The upper horizontal portion (12b) and deform able main frame portion (14a) in effect widen the vertical range of head receiving area and also provide upper and lower support points, to thereby stably receive a head of seat occupant, as indicated by (H) when the head is forcibly pressed against and deeply sunk into the headrest body (15) in the case of backward or rear-end collision. Hence, the seat occupant's head is complete prevented from being inclined forwardly and backwardly relative to the upper horizontal portion (12b) as found in the prior art.

Figure 5:
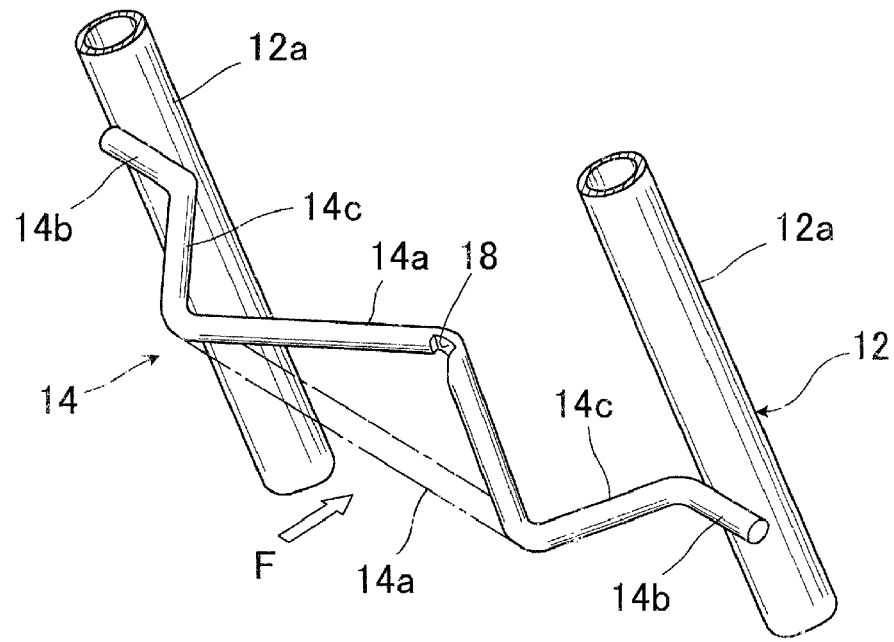
FIG. 5 is a partly broken perspective view showing deformation of an impact absorption bar in the first embodiment.

(ii) In the case of such rear-end collision, the seat occupant's head is abruptly displaced in the backward direction of headrest, under the backward inertia thereof, towards the frontal surface of the headrest (10), which therefore applies a backward excessive great load (at F in FIG. 5) in a direction to a predetermined head receiving area (H) or both upper horizontal frame portion (12b) and impact absorption bar (14). In that case, as shown in FIG. 5, such excessive great load (F) is exerted upon the deform able main frame portion (14a) of the impact absorption bar (14), with the result that a midway point or substantially central point of that deformable main frame portion (14a) is deformed or bent backwardly into a generally "V" shape, thereby insuring to absorb most of corresponding impact energy and thus effectively reducing the impact energy to be imparted to the seat occupant's head. Further, such deformation of the impact absorption bar (14) in generally V-shaped fashion avoids keen contact of the deform able main portion (14a) with the seat occupant's head, thus improving protection of the head as well.

It is to be understood here that the impact absorption bar (14) is formed from a proper material, with the coefficient of cross-section thereof being adjusted and preset such that the two end portions (14b) thereof as well as the two bent intermediate portions (14c) thereof are made rigid enough to resist the backward excessive great load (at F) applied thereto, whereas on the other hand, the deformable main portion (14a) withstands a normal backward load applied from the seat occupant's head, but is to be readily bent or deformed backwards, only in the case where the backward excessive great load (at F) is applied thereto, in an emergency case such as a backward or rear-end collision, or due to a factor causing the backward excessive great load.

The deformable main frame portion (14a) is shown in FIG. 2 as projecting forwardly and downwardly from the upper frame portion (12-1) (or from the two headrest stays (12a)) and being disposed backwardly a small distance relative to the upper horizontal portion (12b). This arrangement of the deformable main frame portion (14a) is appropriate with regard to the shown forwardly inclined type of headrest (1) for attaining an optimum head receiving area (H) as well as an optimum impact absorption effect. This is however not limitative, but, the position and projection of the deformable main frame portion (14a) may be adjusted appropriately according to the structure and configuration of a headrest used in order to attain an optimum head receiving area (H) and optimum deformability of the deformable main frame portion (14a) in an emergency case such as a rear-end collision.

In the present first embodiment, the crank-shaped impact absorption bar (14) assumes a generally "U" configuration as viewed from the forward side of the headrest (1) or the forward side of the generally inverted-U-shaped tubular frame (12), as best seen from the front view of FIG. 1.

FIGS. 3 and 4 show a second alternative embodiment of the headrest (10) which is basically identical in structure to the above-described first embodiment, except that an impact absorption bar (114) is provided, which differs slightly from the afore-said impact absorption bar (14) in terms of shape. Hence, it should be understood that all like designations to be used hereinafter correspond to all like designations previously used in the first embodiment.

In this second embodiment, the impact absorption bar (114) merely assumes a generally inverted-U-shaped configuration on the whole, as opposed to the crank-shaped impact absorption bar (14), but attains the same effects as described in the first embodiment.

The generally inverted-U-shaped impact absorption bar (114) is so formed to have, defined therein:

a pair of connecting end portions (114b) and (114b);

a pair of vertically extending bar portions (114c) and (114c) extending upwardly and continuous from the respective pair of connecting end portions (114b), wherein both of those particular two bar portions (114c) are inclined forwardly at a predetermined same angle from the latter (114b), as best seen in FIG. 4; and a horizontally extending deformable main portion (114a) formed continuously and integrally with the two vertically extending bar portions (114c).

As shown in FIG. 3, the two connecting end portions (114b) are respectively connected, as by welding, with and along the two upper regions respective of the two lower frame portions (12-2) (or the two upper regions respective of the two headrest stays (12a), strictly stated.) so that the deformable main bar portion (114a) extends in a direction transversely of the generally inverted-U-shaped tubular frame (12) and in a parallel reaction with the upper horizontal frame portion (12b) of the latter, so as to define a predetermined head receiving area (H) between those particular upper horizontal portion (12b) and deformable main frame portion (114a).

Figure 6:
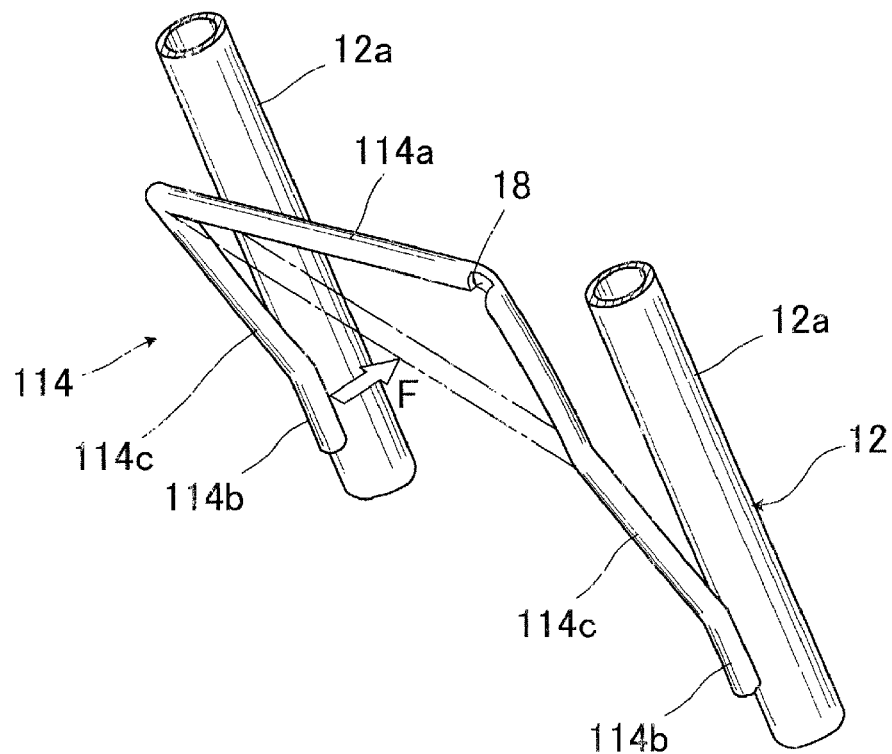
FIG. 6 is a partly broken perspective view showing deformation of an impact absorption bar in the second embodiment.

Thus, this arrangement achieves the same effects as in the first embodiment. Namely, in brief, (i) the upper horizontal portion (12b) and deformable main frame portion (114a) in effect widen the vertical range of head receiving area and also provide upper and lower support points, to thereby stably receive a head of seat occupant, as indicated by (H) when the head is forcibly pressed against and deeply sunk into the headrest body (15) in the case of rear-end collision or the like, and (ii) In the case of such rear-end collision, a backward excessive great load (at F in FIG. 6) is applied to a whole of the head support portion (12-1) of the generally inserted-U-shaped tubular frame (12), and therefore, as shown in FIG. 6, such excessive great load (F) is exerted upon the deformable main frame portion (114a) of the impact absorption bar (114), with the result that a substantially central point of that deformable main frame portion (114a) is deformed or bent backwardly into a generally "V" shape, thereby insuring to absorb most of corresponding impact energy and effectively reducing the impact energy to be imparted to the seat occupant's head. Further, such deformation of the impact absorption bar (14) in generally V-shaped fashion avoids keen contact of the deformable main portion (114a) with the seat occupant's head, thus improving protection of the head as well. The impact absorption bar (114) is also formed from a proper material having a rigid yet deformable property, which withstands a normal load applied from the seat occupant's head, but can be deformed only in the case where an excessive great load (at F) is applied thereto in an emergency case such as a backward or rear-end collision, or due to a factor causing the excessive great load.

Likewise as in the first embodiment, the deformable main frame portion (114a) of the second embodiment is shown in FIG. 4 as projecting forwardly and upwardly from the upper frame portion (12-1) (or from the two headrest stays (12a)) and being disposed backwardly a small distance relative to the upper horizontal portion (12b). This arrangement of the deformable main frame portion (114a) is particularly appropriate with regard to the shown forwardly inclined type of headrest (1) for attaining an optimum head receiving area (H) as well as an optimum impact absorption effect.

In the present first embodiment, the impact absorption bar (114) assumes a generally "inverted-U" configuration as viewed from the forward side of the headrest (1) or the forward side of the generally inverted-U-shaped tubular frame (12), as best seen from the front view of FIG. 3.

For both of the first and second embodiments, it is to be appreciated that only one impact absorption bar (14 or 114) is extended between the two vertical frame portions (12-2) of conventional inverted-U-shaped tubular frame (12) so as to define the head receiving area (H) in the hardest body (15), thus simplifying the headrest structure for more rapid production of headrest and also reducing costs involved in assembly of the headrest.

In the present invention, preferably, a midway point or substantially central point of the impact absorption bar (14 or 114) is made small in the cross-sectional area thereof, thereby defining a readily deformable region in that particular midway point. Of course, in that case, a coefficient of cross-section for the midway point of the impact absorption bar (14 or 114) must be adjusted to an appropriate degree so that such readily deformable region withstands a normal load applied thereto from a seat occupant's head, but will be initially deformed relative to other remaining regions of the impact absorption bar, only when an excessive great load (F) is applied thereto in the case of a backward or rear-end collision, or due to a factor causing the excessive great load.

The afore-said readily deformable region may be embodied by a recessed or cut-away portion (18), as shown in FIGS. 5 and 6, for example.

Namely, FIG. 5 indicates formation of a recessed or cut-away portion (18) in a midway point or a substantially central point of the deformable main bar portion (14a) in the first embodiment, wherein such midway point faces forwardly of the headrest (10). FIG. 6 also indicates formation of such recessed or cut-away portion (18) in a midway point or a substantially central point of the deformable main part portion (114a) in the second embodiment, the midway point facing forwardly of the headrest (10).

In both of those two embodiments, the recessed or cut-away portion (18) effectively makes the corresponding area of deformable main bar portion (14a or 114a) more prone to deformation in by a backward excessive great load (F) applied thereto, to thereby insure deformation of that particular bar portion (14a or 114a) in generally "V" fashion.

While having described the present invention, it should be understood that the present invention is not limited to the illustrated embodiments, but any other modification, replacement and addition may be applied thereto without departing from the scopes of the appended claims.

What is claimed is:

1. A headrest adapted to be mounted on a vehicle seat, comprising:
   a generally inverted-U-shaped frame provided in said headrest, said generally inverted U-shaped frame having, defined therein, a horizontal frame portion disposed at an upper side of said headrest, and a pair of spaced-apart vertical frame portions extending vertically and continuous from said horizontal frame portion in a direction downwardly of the headrest;
   a pair of spaced-apart headrest stays defined integrally in two lower portions respectively of said pair of spaced-apart vertical frame portions, said pair of spaced-apart headrest stays being adapted to be mounted in said vehicle seat;
   a single impact absorption bar element having two end-points that are fixedly connected to said pair of spaced-apart vertical frame portions in such a manner as to extend transversely of said pair of spaced-apart vertical frame portions, while being disposed under, spaced apart from, and substantially parallel to said horizontal frame portion, said impact absorption bar element being of a property prone to deformation only by an excessive great load applied thereto from said head of the seat occupant in case of a rear-end collision or a factor for causing said excessive great load;
   a headrest body including a foam padding filled therein;
   wherein a substantially midway point of said impact absorption bar element thereof is a recessed or cut-away region, thereby defining a readily deformable region in said substantially midway point,
   wherein said horizontal frame portion, said pair of spaced-apart vertical frame portions, and said single impact absorption bar element are embedded integrally in said foam padding of said headrest body, while said pair of spaced-apart headrest stays extend outwardly from said headrest body.

* * * * *